(12) United States Patent
Bauer

(10) Patent No.: US 11,733,019 B2
(45) Date of Patent: Aug. 22, 2023

(54) ASSEMBLY FOR POSITION MEASUREMENT

(71) Applicant: DR. JOHANNES HEIDENHAIN GmbH, Traunreut (DE)

(72) Inventor: Kilian Bauer, Surberg (DE)

(73) Assignee: DR. JOHANNES HEIDENHAIN GMBH, Trauntreut (DE)

( * ) Notice: Subject to any disclaimer, the term of this patent is extended or adjusted under 35 U.S.C. 154(b) by 387 days.

(21) Appl. No.: 17/207,761

(22) Filed: Mar. 22, 2021

(65) Prior Publication Data

US 2021/0318109 A1 Oct. 14, 2021

(30) Foreign Application Priority Data

Apr. 8, 2020 (EP) ..................................... 20168807

(51) Int. Cl.
*G01D 5/20* (2006.01)
*G01B 5/00* (2006.01)
*G01D 5/347* (2006.01)

(52) U.S. Cl.
CPC ............. *G01B 5/0014* (2013.01); *G01D 5/20* (2013.01); *G01D 5/34715* (2013.01)

(58) Field of Classification Search
CPC .................................................. G01B 5/0002
USPC .......................................... 33/706, 707, 708
See application file for complete search history.

(56) References Cited

U.S. PATENT DOCUMENTS

| 4,628,609 | A | * | 12/1986 | Rieder | ................. | G01D 5/2457 |
| | | | | | | 250/237 G |
| 4,701,615 | A | * | 10/1987 | Schmitt | ................... | H03M 1/28 |
| | | | | | | 250/237 G |
| 5,115,573 | A | * | 5/1992 | Rieder | ................. | G01D 5/2457 |
| | | | | | | 250/237 G |
| 5,488,782 | A | * | 2/1996 | Ochiai | ................... | G01D 5/145 |
| | | | | | | 33/708 |
| 5,539,993 | A | * | 7/1996 | Kilpinen | ............ | G01D 5/34792 |
| | | | | | | 33/679.1 |
| 5,793,201 | A | * | 8/1998 | Nelle | ........................ | G01B 7/30 |
| | | | | | | 324/207.2 |
| 5,959,295 | A | * | 9/1999 | Braun | ................... | G01D 5/2457 |
| | | | | | | 250/237 G |
| 6,178,656 | B1 | | 1/2001 | Jung | | |
| 6,658,754 | B2 | * | 12/2003 | Omi | .................... | G01D 5/34761 |
| | | | | | | 33/708 |
| 7,421,800 | B2 | * | 9/2008 | Howley | ............... | G01D 5/2451 |
| | | | | | | 33/1 PT |
| 7,549,234 | B2 | | 6/2009 | Holzapfel et al. | | |

(Continued)

FOREIGN PATENT DOCUMENTS

DE 19802036 A1 7/1999
DE 102007002772 A1 10/2007

(Continued)

*Primary Examiner* — George B Bennett
(74) *Attorney, Agent, or Firm* — Leydig, Voit & Mayer Ltd.

(57) ABSTRACT

An assembly comprises a support including a plurality of individual sections. A scale is disposed on the support. The scale extends in a longitudinal direction and has a measuring graduation for position measurement at least in the longitudinal direction. A plurality of fastening devices are configured to fasten the scale to the support. The fastening devices are disposed on the individual sections of the support.

15 Claims, 6 Drawing Sheets

(56) References Cited

U.S. PATENT DOCUMENTS

| | | | |
|---|---|---|---|
| 7,571,552 B2 * | 8/2009 | McAdam | G01D 5/2451 341/51 |
| 7,988,440 B2 * | 8/2011 | Schmidt | B30B 11/005 73/1.79 |
| 7,994,775 B2 * | 8/2011 | Shiao | G01D 5/2457 324/207.24 |
| 8,011,112 B2 * | 9/2011 | Hanns | G01D 5/34792 33/706 |
| 8,359,764 B2 | 1/2013 | Pucher et al. | |
| 8,782,916 B2 | 7/2014 | Yan et al. | |
| 9,618,368 B2 * | 4/2017 | Schlichtner | G01D 5/2457 |
| 9,772,204 B2 * | 9/2017 | Bauer | G01D 5/34707 |
| 10,627,204 B2 * | 4/2020 | Hagino | G01B 5/008 |
| 11,490,576 B2 * | 11/2022 | Sanders | F16L 37/00 |
| 2016/0187117 A1 * | 6/2016 | Otsuka | G01B 11/04 33/770 |

FOREIGN PATENT DOCUMENTS

| | | |
|---|---|---|
| EP | 2431705 A1 | 3/2012 |
| EP | 3026389 A1 | 6/2016 |
| WO | WO 2006133753 A1 | 12/2006 |

* cited by examiner

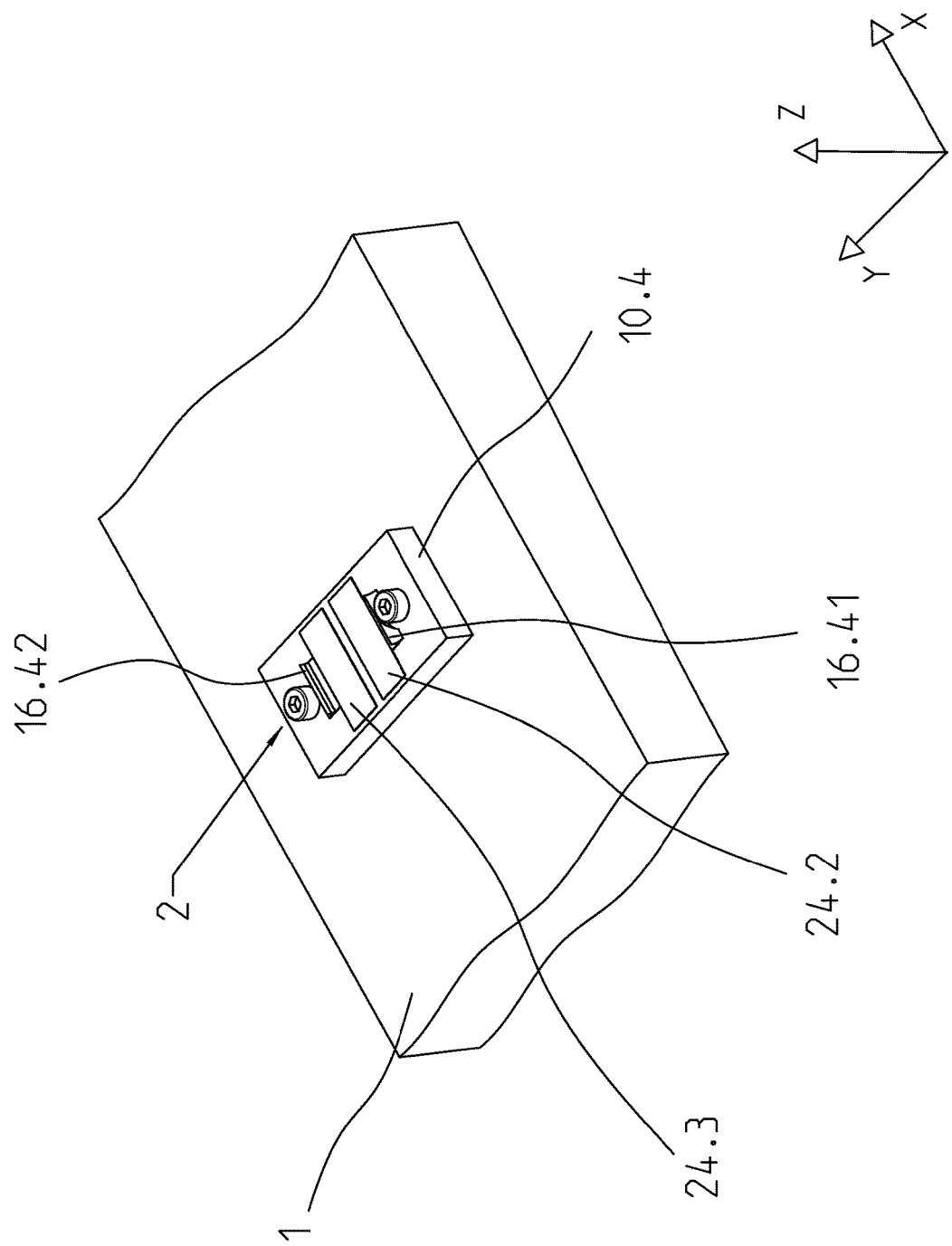

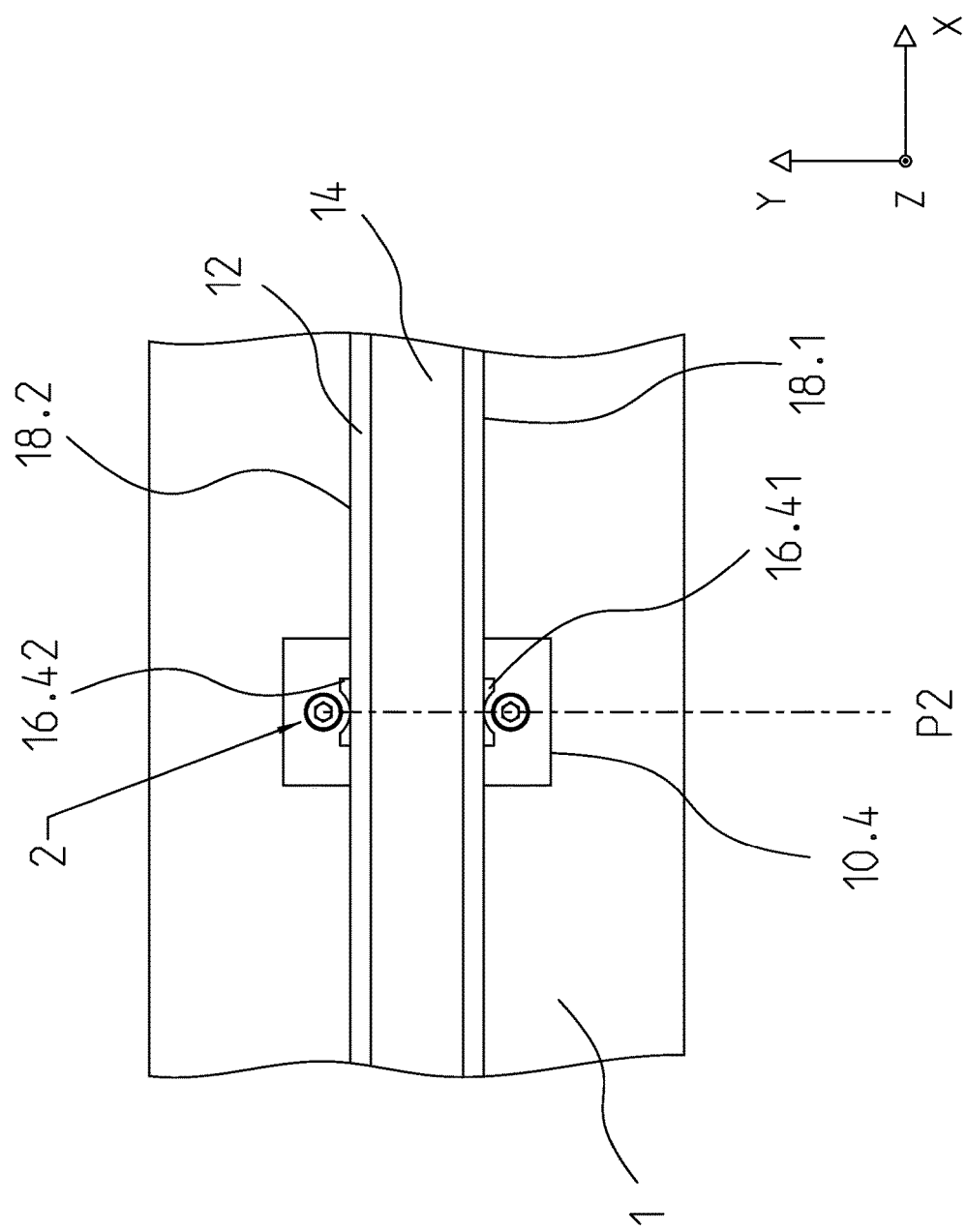

ASSEMBLY FOR POSITION MEASUREMENT

CROSS-REFERENCE TO PRIOR APPLICATION

Priority is claimed to European Patent Application No. 20 168 807.4, filed on Apr. 8, 2020, the entire disclosure of which is hereby incorporated by reference herein.

FIELD

The present invention relates to an assembly for position measurement.

BACKGROUND

WO 2006/133753 A1 describes an assembly for position measurement including a support body and a plurality of fastening devices disposed along a scale on both sides thereof. Disposed between the support body and each of the fastening devices is a flexure bearing which couples the fastening device, and thus the scale, to the support body in a manner allowing the fastening device and the scale to be displaced in measuring direction X.

SUMMARY

In an embodiment, the present invention provides an assembly. The assembly comprises a support including a plurality of individual sections. A scale is disposed on the support. The scale extends in a longitudinal direction and has a measuring graduation for position measurement at least in the longitudinal direction. A plurality of fastening devices are configured to fasten the scale to the support. The fastening devices are disposed on the individual sections of the support.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 3b is a plan view of the individual section of the support shown in FIG. 3a;

FIG. 4a is a perspective view of a further individual section of the support including a third fastening device and a fourth fastening device; and FIG. 4b is a plan view of the further individual section of the support shown in FIG. 4a.

DETAILED DESCRIPTION

Figure 1:
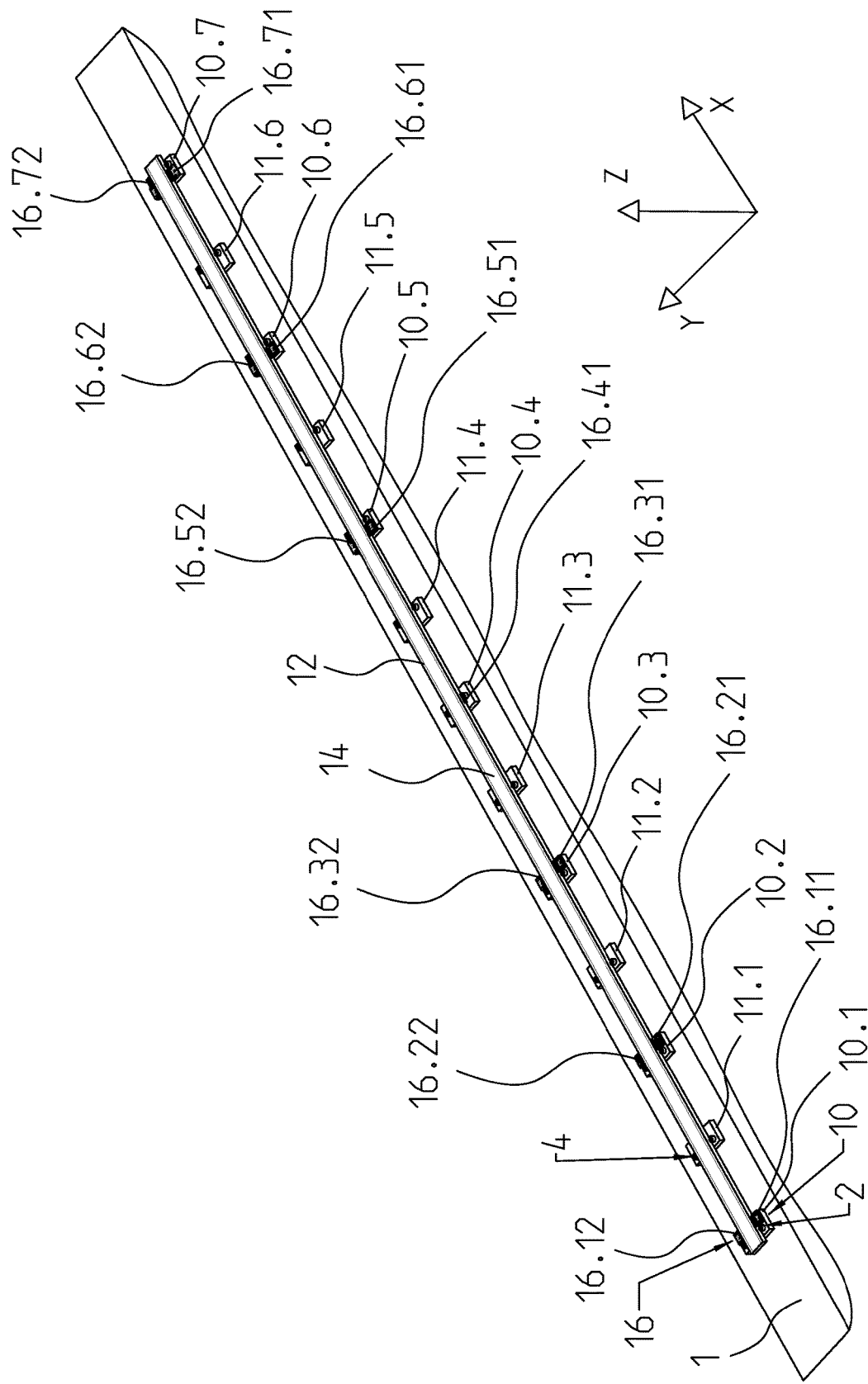
FIG. 1 is a perspective view of an assembly designed in accordance with an embodiment of the present invention and including a support, a scale disposed on the support, and a plurality of fastening devices.

It is a disadvantage of the known measurement assembly described above that the support body is formed as a single piece. As a result, on one hand, the support body and the measurement assembly are relatively cost-intensive to manufacture. On the other hand, thermal isolation between the support body (or the measurement assembly) and a base (e.g., machine bed) is relatively complicated to implement. The reason is that this typically requires design measures such as the use of additional flexure bearings. Thermal isolation is, in turn, a prerequisite for high position measurement accuracy In an embodiment, the present invention provides an assembly for position measurement that is simple and cost-effective in design and permits accurate position measurement.

The assembly designed in accordance with an embodiment of the present invention includes a support, a scale disposed on the support, and a plurality of fastening devices for fastening the scale to the support. The scale extends in a longitudinal direction. The scale has a measuring graduation for position measurement at least in the longitudinal direction. The support includes a plurality of individual sections. The fastening devices are disposed on the individual sections.

Preferably, the individual sections of the support are each associated with one fastening device or with a pair of fastening devices of the plurality of fastening devices, the fastening devices of a respective pair being disposed opposite each other in a transverse direction perpendicular to the longitudinal direction.

It is advantageous if the individual sections of the support are spaced apart in the longitudinal direction.

It is also advantageous if the individual sections of the support are distributed, e.g., equidistantly distributed, in the longitudinal direction.

Alternatively, the individual sections of the support may be arranged in non-equidistant relationship to each other. For example, the distance between the individual sections of the support is greater in the vicinity of a fixed point (i.e., a point of stationary attachment of the scale) than between the individual sections of the support at the two free ends of the scale.

The fastening devices preferably include a plurality of flexure bearings for (local) thermal isolation between the support and the scale.

For stationary attachment of the scale with respect to the support, a fastening device in the form of an adhesive bead may be provided.

The individual sections of the support may also be referred to as discrete plates.

The measuring graduation is preferably used for position measurement in the longitudinal direction (i.e., degree of freedom X) and in the transverse direction (i.e., degree of freedom Y). Alternatively, the measuring graduation (in conjunction with suitable scanning units) may be configured to allow position measurement in six degrees of freedom (i.e., degrees of freedom X, Y, Z, RX, RY, RZ).

The measuring graduation is, for example, an incremental graduation. Alternatively, the measuring graduation may also be an absolute graduation, for example in the form of a pseudo-random code.

By means of embodiments of the present invention, a high reproducibility of the straightness of the scale is achieved. This is advantageous, particularly when the scale includes the measuring graduation for position measurement in the longitudinal direction and in the transverse direction. For this purpose, the measuring graduation includes a plurality of graduation structures periodically arranged along a first measurement direction (main measurement direction or X-direction) and a plurality of graduation structures periodically arranged along a second measurement direction (Y-direction). The first measurement direction and the second measurement direction are perpendicular to each other. Each of the graduation structures includes, in particular, a plurality of graduation lines.

In the Figures, identical or functionally identical elements are denoted by the same reference numerals.

An embodiment of the present invention will now be described with reference to FIGS. 1 and 2. The assembly designed in accordance with an embodiment of the present invention includes a support 10, a scale 12 disposed on support 10, and a plurality of fastening devices 16. Scale 12 extends in a longitudinal direction (main measurement direction) X and has a measuring graduation 14 disposed in a measuring graduation plane (i.e., X/Y plane). Measuring graduation 14 is configured as a photoelectrically scannable incremental graduation for high-accuracy position measurement in longitudinal direction X and, in addition, in a second transverse direction Y extending perpendicularly thereto. Scale 12 is preferably composed of a material having a negligibly small thermal expansion coefficient, in particular a thermal expansion coefficient α of less than $1.5 \times 10^{-6}$ K$^{-1}$, more particularly of less than $0.1 \times 10^{-6}$ K$^{-1}$, in a temperature range from 0° to 50° C. Such materials include glass and glass-ceramic materials (e.g., Zerodur), as well as metals such as Invar, for example.

Support 10 is preferably made of steel having a thermal expansion coefficient of about $10.5 \times 10^{6}$ K$^{-1}$.

Support 10 includes a plurality of individual plate-like sections 10.1-10.7. Scale 12 has a rectangular cross section with two opposite side faces 18.1, 18.2, each extending in longitudinal direction X (see FIG. 2).

Fastening devices 16 serve to fasten scale 12 to support 10. Fastening devices 16 include a first group of fastening devices 16.11-16.71 and a second group of fastening devices 16.12-16.72. Fastening devices 16.11-16.71 and 16.12-16.72 are disposed at the two opposite side faces 18.1, 18.2 of scale 12 (see FIG. 2). As illustrated in FIG. 1, fastening devices 16 are disposed on the individual sections 10.1-10.7 of support 10.

Figure 2:
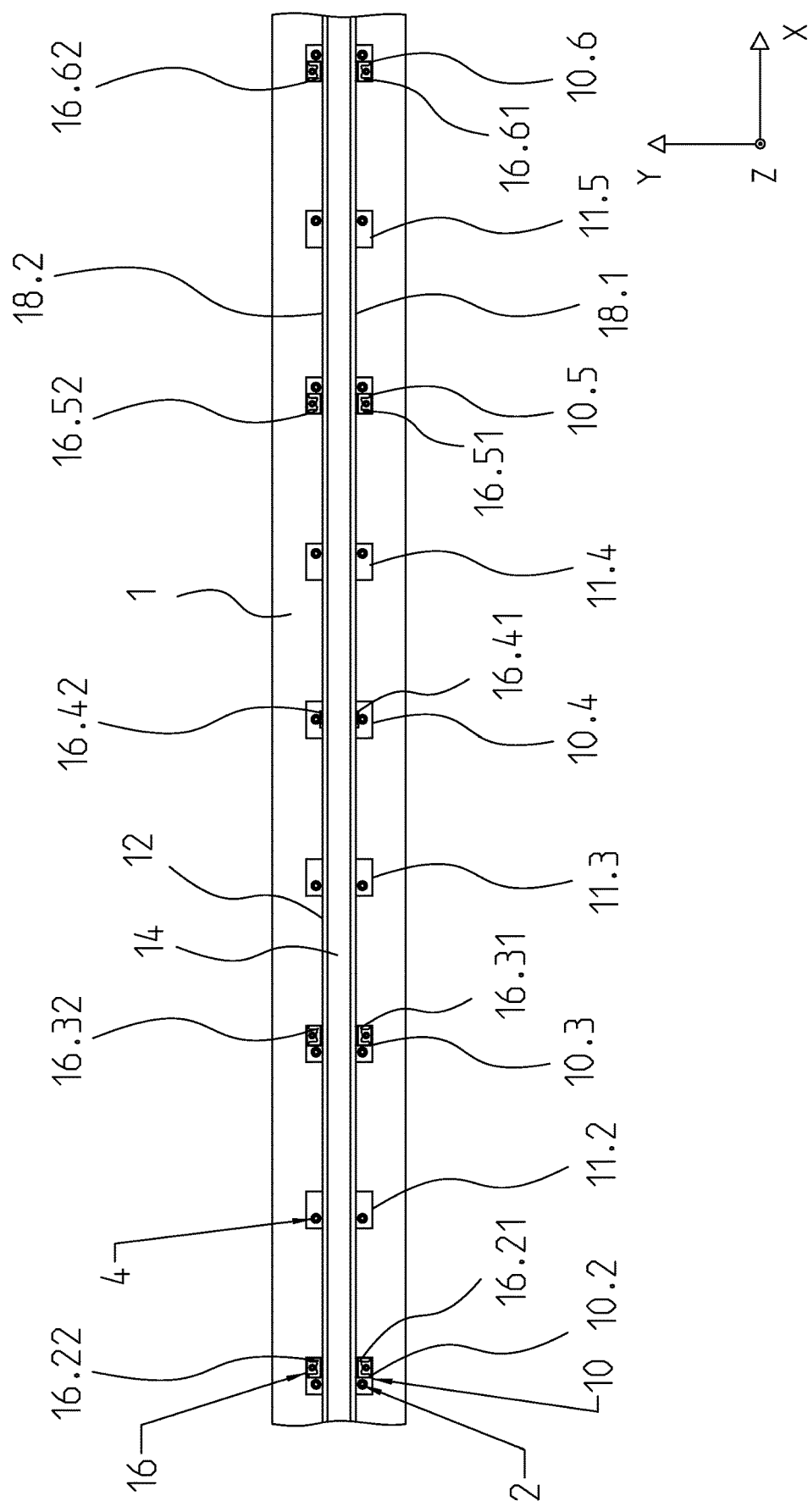
FIG. 2 is a plan view of the assembly of FIG. 1.

The assembly shown in FIG. 1 is disposed on a base 1 (e.g. machine bed). Screws 2 are provided for attachment of the assembly to base 1. Screws 2 extend through the individual sections 10.1-10.7 into base 1. Base 1 is composed of, for example, granite.

The assembly according to an embodiment of the present invention provides a support body (i.e., support 10) that is implemented as multiple pieces. Compared to the single-piece design according to the prior art, the multi-piece design is advantageous in that the support body, and thus the assembly, is relatively cost-effective to manufacture. Furthermore, the multi-piece design has the advantage of allowing thermal isolation between support 10 and base 1 to be accomplished in a simple manner. In this context, it is possible, in particular, to dispense with additional design measures, such as the use of additional flexure bearings.

It is advantageous that the individual sections (discrete plates) 10.1-10.7 of support 10 are relatively small and can readily move in unison with base 1 at virtually any point (i.e., locally at the respective X position). Unlike the prior art, this allows the aforementioned thermal isolation to be accomplished without the use of additional design measures.

Disposed between the individual sections 10.1-10.7 of support 10 are further sections (called "intermediate sections"). Intermediate sections 11.1-11.6 are fastened to base 1 by screws 4 and serve to support scale 12 in a vertical direction (i.e., Z-direction). To this end, intermediate sections 11.1-11.6 are configured to support scale 12 on support 10 such that it is fixed in vertical direction Z via adhesive means at respective intermediate positions; i.e., positions between the individual sections 10.1-10.7 of support 10, and thereby rigidly attach it to base 1. Intermediate sections 11.1-11.6 may also be omitted.

Referring to FIG. 1, the individual sections 10.1-10.7 of support 10 are each associated with a pair of fastening devices 16.11, 16.12-16.71, 16.72 of the plurality of fastening devices 16, the fastening devices of a respective pair being disposed opposite each other in transverse direction Y. In particular, the paired fastening devices 16.11, 16.12-16.71, 16.72 are disposed on the individual sections 10.1-10.7 of support 10 that are associated respectively therewith.

Alternatively, the individual sections 10.1-10.7 of support 10 may each be associated with only one fastening device (e.g., fastening devices 16.11-16.71 or fastening device 16.12-16.72) of the plurality of fastening devices 16.

As illustrated in FIG. 1, the individual sections 10.1-10.7 of support 10 are spaced apart in longitudinal direction X. Furthermore, the individual sections 10.1-10.7 of support 10 are distributed, in particular equidistantly distributed, in longitudinal direction X. The distance between the individual sections 10.1-10.7 of support 10 is, for example, 100 mm.

The fastening devices 16 shown in FIG. 1 include a first fastening device 16.11 disposed at first side face 18.1 of scale 12 and a second fastening device 16.12 disposed at second side face 18.2 of scale 12. First fastening device 16.11 and second fastening device 16.12 are disposed opposite each other in transverse direction Y. The following explanations apply analogously to the paired fastening devices 16.21, 16.22-16.71, 16.72 (except for 16.41, 16.42).

First fastening device 16.11 is configured to support scale 12 at a position P1 (see FIG. 3b) such that it is freely movable in longitudinal direction X relative to support 10. Furthermore, first fastening device 16.11 is configured to support scale 12 on support 10 such that it is fixed in transverse direction Y. To this end, first fastening device 16.11 is configured in particular as a flexure bearing.

Figure 3A:
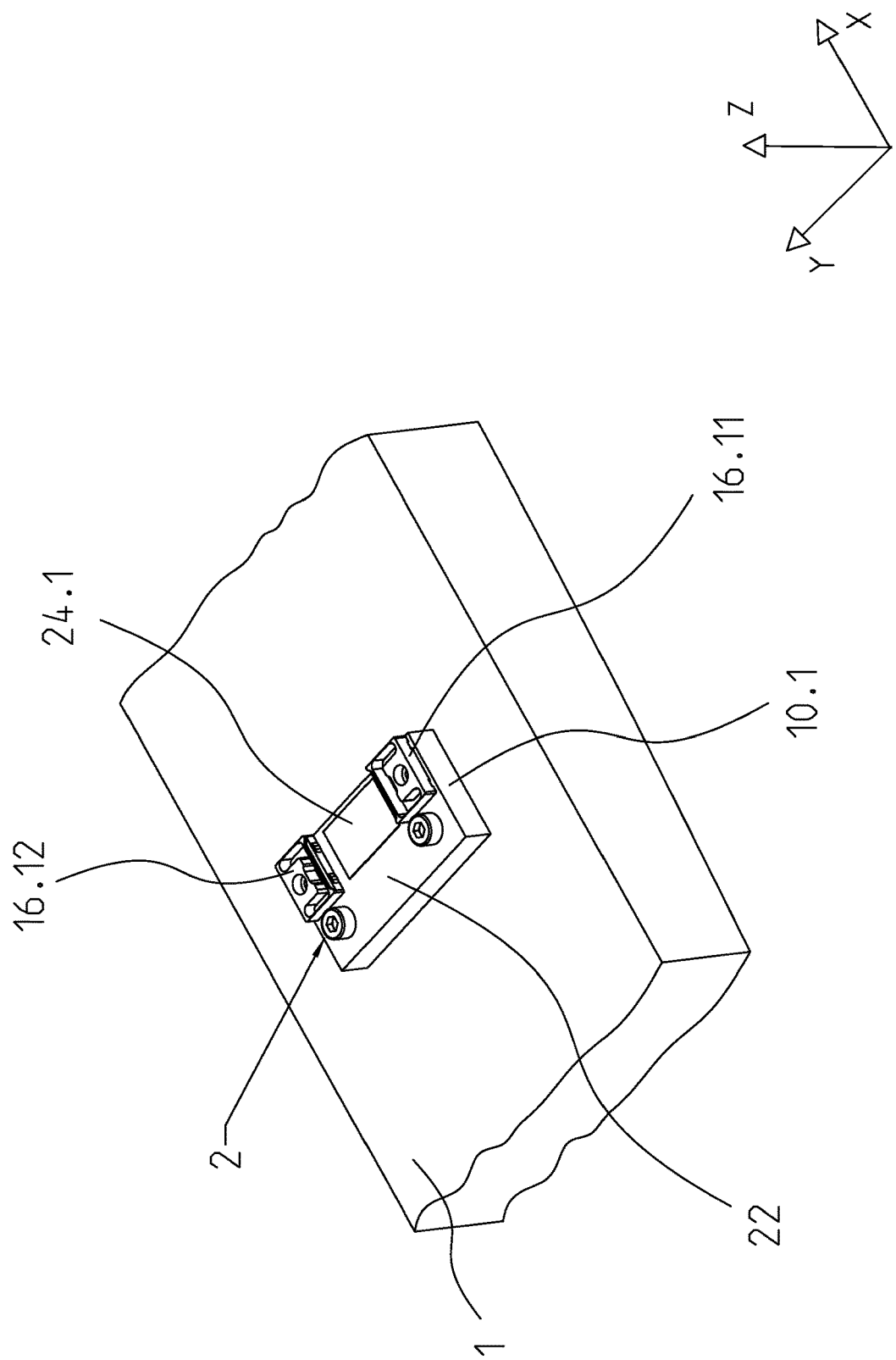
FIG. 3a is a perspective view of an individual section of the support including a first fastening device and a second fastening device.
Figure 3B:
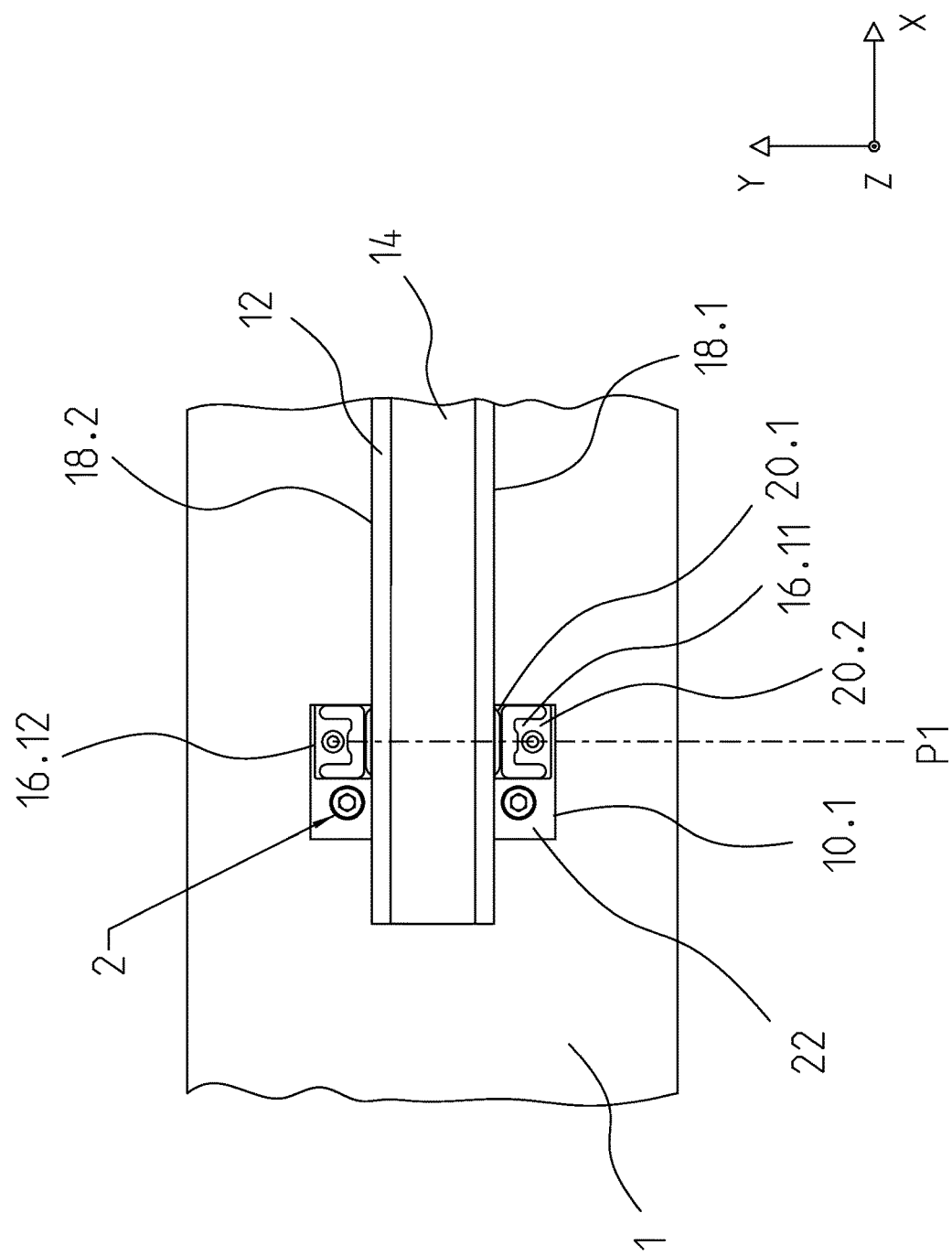

Referring to FIG. 3b, first fastening device 16.11 has a first portion 20.1 which is fastened to first side face 18.1 of scale 12 by a material-to-material bond. Furthermore, first fastening device 16.11 has a second portion 20.2 which is fastened, by a material-to-material bond, to a top face 22 of a section 10.1 of the individual sections 10.1-10.7 of support 10, which section 10.1 is associated with first fastening device 16.11 (see FIGS. 3a and 3b). The material-to-material bond is in particular an adhesive bond.

Second fastening device 16.12 is configured to support scale 12 at first position P1 such that it is freely movable in longitudinal direction X relative to support 10. Furthermore, second fastening device 16.12 is configured to support scale 12 on support 10 such that it is fixed in transverse direction Y. To this end, second fastening device 16.12 is configured in particular as a flexure bearing.

Analogously to first fastening device 16.11, second fastening device 16.12 is attached to scale 12 as well as to section 10.1 of support 10.

Referring to FIG. 3a, the assembly has a first adhesive means 24.1 for fastening scale 12 to support 10. First adhesive means 24.1 is disposed on top face 22 of section 10.1 of support 10 on the one hand, and between first fastening device 16.11 and second fastening device 16.12 on the other hand. First adhesive means 24.1 is strip-shaped and extends substantially in transverse direction Y. For example, first adhesive means 24.1 includes a strip of a double-sided adhesive tape, in particular of a transfer adhesive tape.

First adhesive means 24.1 is correspondingly disposed on each of the sections 10.1-10.7 of support 10 (except for 10.4).

The fastening devices 16 shown in FIG. 1 further include a third fastening device 16.41 disposed at first side face 18.1 of scale 12 and a fourth fastening device 16.42 disposed at second side face 18.2 of scale 12. Third fastening device 16.41 and fourth fastening device 16.42 are disposed opposite each other in transverse direction Y. The paired fastening devices 16.41, 16.42 are associated with (i.e., disposed on) section 10.4 of support 10.

Third fastening device 16.41 is configured to support scale 12 on support 10 at a second position P2 different from first position P1 (see FIG. 4*b*) such that it is fixed in longitudinal direction X and in transverse direction Y. Fourth fastening device 16.42 is configured to support scale 12 on support 10 at second position P2 such that it is fixed in longitudinal direction X and in transverse direction Y. For example, third fastening device 16.41 and fourth fastening device 16.42 each include an adhesive bead, in particular a fillet joint, for connecting scale 12 to section 10.4 of support 10.

Referring to FIG. 4*a*, the assembly further has a second adhesive means 24.2 and a third adhesive means 24.3 for fastening scale 12 to support 10. Second adhesive means 24.2 and third adhesive means 24.3 are disposed on a top face of section 10.4 of support 10 on the one hand, and between third fastening device 16.41 and fourth fastening device 16.42 on the other hand. Second adhesive means 24.2 and third adhesive means 24.3 are each strip-shaped and extend substantially in longitudinal direction X. For example, second adhesive means 24.2 and third adhesive means 24.3 each include a strip of a double-sided adhesive tape, in particular of a transfer adhesive tape.

First through third adhesive means 24.1-24.3 serve to assist in the attachment of scale 12 by first through fourth fastening devices 16.11, 16.12, 16.41, 16.42. Thus, a particularly stable and reliable construction is achieved for the assembly.

Furthermore, first through third adhesive means 24.1-24.3 serve to isolate scale 12 from support 10 so as to prevent influences of friction (or to generate defined shear forces).

For example, first through third adhesive means 24.1-24.3 each include a strip of a double-sided adhesive tape having a width of 10 mm.

Instead of the aforementioned transfer adhesive tape, a very soft adhesive having spherical particles admixed therein or a liquid transfer adhesive may also be used.

Moreover, third and fourth fastening devices 16.41, 16.42 may alternatively be configured to support or couple scale 12 on or to support 10 at second position P2 rigidly in longitudinal direction X, but flexibly (non-rigidly) in transverse direction Y. A linkage of this kind is described in particular in EP 3 026 389 A1.

An advantage of the invention is that scale 12 is attached to base 1 by fastening devices 16 in such a manner that transverse forces (e.g., transversal acceleration) in the Y-direction will not cause any appreciable transverse movement or deformation of the scale. This is advantageous, especially in the case of the measuring graduation 14 for position measurement in the longitudinal direction (i.e., degree of freedom X) and in the transverse direction (i.e., degree of freedom Y).

Base 1 is preferably composed of a material having a thermal expansion coefficient less than that of support 10.

The invention is not limited to the photoelectric scanning principle. In particular, measuring graduation 14 may also be adapted to be scannable magnetically or inductively.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An assembly comprising:
   a support including a plurality of individual sections;
   a scale disposed on the support, the scale extending in a longitudinal direction and having a measuring graduation for position measurement at least in the longitudinal direction; and
   a plurality of fastening devices configured to fasten the scale to the support, the fastening devices being disposed on the individual sections of the support.

2. The assembly as recited in claim 1, wherein the individual sections of the support are each associated with one of the fastening devices or with a pair of the fastening devices, the fastening devices of a respective pair being disposed opposite each other in a transverse direction perpendicular to the longitudinal direction.

3. The assembly as recited in claim 1, wherein the individual sections of the support are spaced apart in the longitudinal direction.

4. The assembly as recited in claim 1, wherein the individual sections of the support are equidistantly distributed in the longitudinal direction.

5. The assembly as recited in claim 1, wherein the fastening devices include at least a first fastening device disposed at a first side face of the scale extending in the longitudinal direction.

6. The assembly as recited in claim 5, wherein the first fastening device is configured to support the scale at a first position such that the scale is freely movable in the longitudinal direction relative to the support.

7. The assembly as recited in claim 5, wherein the first fastening device is configured to support the scale on the support such that the scale is fixed in a transverse direction perpendicular to the longitudinal direction.

8. The assembly as recited in claim 5, wherein the first fastening device has a first portion which is fastened to the first side face of the scale by a material-to-material bond.

9. The assembly as recited in claim 5, wherein the first fastening device has a second portion, the second portion being fastened, by a material-to-material bond, to a top face of one of the individual sections of the support.

10. The assembly as recited in claim 8, wherein the material-to-material bond is an adhesive bond.

11. The assembly as recited in claim 5, wherein the fastening devices include a second fastening device disposed at a second side face of the scale extending in the longitudinal direction, the first fastening device and the second fastening device being disposed opposite each other in a transverse direction perpendicular to the longitudinal direction.

12. The assembly as recited in claim 11, wherein the first fastening device and the second fastening device each include a flexure bearing.

13. The assembly as recited in claim 11, further comprising at least a first adhesive for fastening the scale to the support, the first adhesive being disposed on a top face of one of the individual sections of the support that is associated with the first fastening device and the second fastening device, and between the first fastening device and the second fastening device.

14. The assembly as recited in claim 13, wherein the first adhesive is strip-shaped and extends substantially in a transverse direction perpendicular to the longitudinal direction.

15. The assembly as recited in claim 6, wherein the fastening devices include at least a third fastening device disposed at the first side face of the scale, the third fastening device being configured to support the scale on the support at a second position different from the first position such that the scale is fixed in the longitudinal direction and in a transverse direction perpendicular to the longitudinal direction.

\* \* \* \* \*